United States Patent
Agin et al.

(10) Patent No.: US 7,539,122 B2
(45) Date of Patent: May 26, 2009

(54) DEVICE AND METHOD FOR MANAGEMENT OF THE TRANSMISSION OF BLOCKS OF DATA IN AN HS-DSCH DOWNLINK CHANNEL OF A MOBILE COMMUNICATIONS NETWORK

(75) Inventors: Pascal Agin, Chatillon (FR); Rémi Stefanini, Paris (FR)

(73) Assignee: Evolium S.A.S., Paris (FR)

( * ) Notice: Subject to any disclaimer, the term of this patent is extended or adjusted under 35 U.S.C. 154(b) by 636 days.

(21) Appl. No.: 11/092,745

(22) Filed: Mar. 30, 2005

(65) Prior Publication Data

US 2005/0220204 A1    Oct. 6, 2005

(30) Foreign Application Priority Data

Mar. 31, 2004    (FR)    ................... 04 50631

(51) Int. Cl.
- *H04J 9/00*    (2006.01)
- *H04L 5/04*    (2006.01)
- *H04J 11/00*    (2006.01)
- *H04L 5/12*    (2006.01)
- *H04L 23/02*    (2006.01)

(52) U.S. Cl. ................ 370/204; 370/206; 370/215; 370/329; 375/261

(58) Field of Classification Search ............... 370/203, 370/204, 206, 215, 329; 375/261
See application file for complete search history.

(56) References Cited

U.S. PATENT DOCUMENTS

| | | |
|---|---|---|
| 2003/0081576 A1 | 5/2003 | Kim |
| 2003/0081690 A1 | 5/2003 | Kim |
| 2003/0097629 A1 | 5/2003 | Kim |
| 2003/0133497 A1 | 7/2003 | Kinjo |

OTHER PUBLICATIONS

Ji Tingang et al, "Concatenated punctured turbo Reed-Solomon codes in a hybrid FEC/ARQ DS/SSMA data network", Vehicular Technology Conference, 1999 IEEE 49th Houston, Texas, USA, May 16-20, 1999, Piscataway, NJ, May 16, 1999, pp. 1678-1682.

*Primary Examiner*—Chi H Pham
*Assistant Examiner*—Farah Faroul
(74) *Attorney, Agent, or Firm*—Sughrue Mion, PLLC (57) ABSTRACT

A device (D) is dedicated to managing transmission of digital data blocks in High-Speed Downlink Shared Channel (HS-DSCH) downlink transport channel set up between a base station of a communications network and a user equipment. It comprises processing means (MT) adapted, each time that a given block must be transmitted to the user equipment via the transport channel, to select successive values of the redundancy parameter $X_{RV}$ in accordance with a selected sequence in which the value of the redundancy parameter $X_{RV}$ used for the first block transmission is selected to give priority to transmitting systematic bits.

21 Claims, 3 Drawing Sheets

DEVICE AND METHOD FOR MANAGEMENT OF THE TRANSMISSION OF BLOCKS OF DATA IN AN HS-DSCH DOWNLINK CHANNEL OF A MOBILE COMMUNICATIONS NETWORK

BACKGROUND OF THE INVENTION

1. Field of the Invention

The invention relates to the field of mobile communications networks, to be more precise to managing the transmission of digital data blocks in HS-DSCH transport channels of such networks.

2. Description of Related Art

As the person skilled in the art is aware, the fifth version of the 3GPP specifications governing the transmission of multimedia data in mobile (or cellular) communications networks, for example GSM/GPRS, UMTS and EDGE networks, proposes a High Speed Downlink Packet Access (HSDPA) mechanism, one particular objective of which is to provide a high bit rate for transmitting downlink packet traffic, for example Internet traffic, that is virtually insensitive to transmission delay. It is based on using transport channels known as high speed—downlink shared channels (HS-DSCH) that are shared between user equipments.

An HS-DSCH transport channel is situated between the MAC layer and the physical layer. Data bits coming from the HS-DSCH transport channel are transmitted to a user equipment in a set of physical channels that is situated at the level of the physical layer and that consists of at least one physical channel called an HS-PDSCH.

In the present context, the expression "user equipment" means any communications terminal able to exchange data by radio with a mobile (or cellular) communications network.

Obtaining high bit rates relies in particular on employing a Hybrid Automatic Repeat reQuest (HARQ) technique whereby, each time that a user equipment receives an incorrect data block from its base station on an HS-DSCH transport channel, that base station is sent a Non-Acknowledgment (NACK) message indicating incorrect reception, as a result of which it sends it a new block of data bits in the HS-DSCH transport channel. On receiving this new block, the user equipment combines the data that it contains with the data contained in the block or blocks previously received incorrectly, which is temporarily stored in a dedicated buffer.

There are two retransmission modes, one called "chase combining" (CC) and the other called "incremental redundancy" (IR). On each occasion, the CC mode retransmits a block containing the same set of data as the original block, whereas the IR mode retransmits blocks containing sets of data that all differ partly from each other. In the IR mode, each set of data is chosen as a function of the value of a redundancy parameter $X_{RV}$ that varies from one block to another and is used in a rate matching step.

As the person skilled in the art is aware, the IR management mode is more efficient than the CC management mode, so that it is particularly important to select optimum values of the redundancy parameter $X_{RV}$.

BRIEF SUMMARY OF THE INVENTION

An objective of the invention is to optimise the selection for a given base station of the value of the redundancy parameter $X_{RV}$ used in the rate matching step to define the set of data of each block to be transmitted.

To this end the invention proposes a device for managing transmission of digital data blocks (of the "systematic" type and/or the "parity 1 or 2" type) in an HS-DSCH downlink transport channel set up between a base station of a communications network and a user equipment, for a transport channel coding system.

The device comprises processing means adapted to select a value of a redundancy parameter $X_{RV}$ with a view to the transmission of a block to said user equipment including a first set of digital data selected as a function of said value, and in the event of incorrect reception of a block by said user equipment, to select at least one other value of said redundancy parameter $X_{RV}$ with a view to transmission to said user equipment of at least one other block including another set of digital data selected as a function of said other value of $X_{RV}$.

According to the invention, the processing means are further adapted, each time that a given block must be transmitted in said channel, to select successive values of the redundancy parameter $X_{RV}$ in accordance with a selected sequence in which the value of the redundancy parameter $X_{RV}$ used for the first block transmission is selected to give priority to transmitting systematic bits.

The processing means are preferably adapted to select said successive values of the redundancy parameter $X_{RV}$ in accordance with a selected sequence in which the value of the redundancy parameter $X_{RV}$ used for each block transmission after the first transmission is selected so as to give priority alternately to transmitting parity 1 or parity 2 bits and to transmitting systematic bits.

The processing means can also and/or instead be adapted to select said successive values of the redundancy parameter $X_{RV}$ in accordance with a selected sequence in which each value of the redundancy parameter $X_{RV}$ is selected to alternate bit/symbol matching on each transmission.

The invention may be applied equally to transmission using QPSK modulation, for which $X_{RV}$ is defined in the current UMTS standard by the first variable s and the second variable r, for example, the variable s can take two values selected from 0 and 1 and the variable r can take at least two values selected from 0, 1, 2 and 3, and to transmission using 16 QAM modulation, for which $X_{RV}$ is defined in the current UMTS standard by the first variable s, the second variable r and a third variable, for example, the first variable s can take two values selected from 0 and 1, the second variable r can take at lest two values selected from 0 and 1 and the third variable (for example the variable b) is for defining a bit/symbol match; the variable b generally takes at least two values selected from 0, 1, 2 and 3.

In the case of QPSK modulation, the processing means can be adapted to select each sequence so that it constitutes a series of values of $X_{RV}$ in which the first value, corresponding to the first transmission, is even. That series preferably includes alternating even and odd values of $X_{RV}$, the first value, corresponding to the first transmission, being even.

For example, under the UMTS standard, if $X_{RV}$ depends only on the parameters r and s, then $X_{RV}$ can be defined by the equation $X_{RV}=2r+1-s$.

Moreover, the processing means can be adapted to select each sequence so that it constitutes a series of alternating even values of $X_{RV}$ corresponding to a variable s equal to 1 and odd values of $X_{RV}$ corresponding to a variable s equal to 0.

Also, the processing means may be adapted to select each sequence so that it constitutes a series of values of $X_{RV}$ in which the value of the variable r varies with each value of $X_{RV}$ or every two values of $X_{RV}$.

For example, the processing means can be adapted to constitute each sequence in the form of a series of redundancy values $X_{RV}$ selected from at least a portion of the series {0,1,2,3,4,5,6,7}, {0,1,2,3} and {2,1,0,3,4}, for example containing at least their first four values. Here the values 0,1,2,3,4,5,6 and 7 respectively correspond to the pairs of (s,r) values (1,0), (0,0), (1,1), (0,1), (1,2), (0,2), (1,3) and (0,3).

In the case of 16 QAM modulation, the processing means can be adapted to select each sequence so that it constitutes a series of values of $X_{RV}$ in which the value of the second variable r varies with each value of $X_{RV}$ or every two values of $X_{RV}$, for example at least on the first two, three or four transmissions. Instead of this, or in addition to this, the processing means can be adapted to select each sequence so that it constitutes a series of values of $X_{RV}$ in which the value of the third variable b varies with each value of $X_{RV}$ or every two values of $X_{RV}$, for example at least on the first two, three or four transmissions. The processing means can also and/or instead be adapted to select each sequence so that it constitutes a series of values of $X_{RV}$ in which the values of the second variable r and the third variable s vary simultaneously or alternately, for example at least on the first two, three or four transmissions.

In this case, the processing means can be adapted, for example, to constitute each sequence in the form of a series of values of the redundancy parameter $X_{RV}$ chosen from at least a portion of the series {0,3,5,1,2}, {0,3,5,1,4}, {0,3,5,1,6}, {0,3,5,1,7}, {0,3,6,1,2}, {0,3,6,1,4}, {0,3,6,1,5}, {0,3,6,1,7}, {6,3,7,1,0}, {6,3,7,1,2}, {6,3,7,1,4} and {6,3,7,1,5}. The values 0, 1, 2, 3, 4, 5, 6 and 7 here correspond to respective triplets of values of the first, second and third variables (s,r,b), as follows: (1,0,0), (0,0,0), (1,1,1), (0,1,1), (1, 0, 1), (1,0,2), (1,0,3) and (1,1,0).

The processing means are preferably adapted to select each sequence so that it constitutes a series of alternating values of the redundancy parameter $X_{RV}$ in which the first variable s is either equal to 1 or equal to 0.

Whichever type of modulation is used, the processing means can be adapted to use the selected sequence cyclically.

The invention also proposes, firstly, a base station for a mobile communications network, secondly, a rate matching system for a transport channel coding system of a base station of a mobile communications network, and, thirdly, a transport channel coding system for a base station of a mobile communications network, all equipped with a management device of the type described hereinabove.

The invention further proposes a radio network controller (RNC) for a mobile communications network comprising a management device of the type described hereinabove adapted to provide a base station of the network with sequences of values of the redundancy parameter $X_{RV}$.

The invention is particularly well suited, although not exclusively so, to the field of 3GPP radio communications, and in particular to W-CDMA, CDMA 2000, IS95, UMTS, GSM/GPRS and EDGE networks.

BRIEF DESCRIPTION OF THE DRAWINGS

Other features and advantages of the invention will become apparent on reading the following detailed description and examining the appended drawings, in which.

DETAILED DESCRIPTION OF EXEMPLARY EMBODIMENTS OF THE PRESENT INVENTION

The appended drawings constitute part of the description of the invention and may, if necessary, contribute to the definition of the invention An objective of the invention is to optimise the selection of the value of the redundancy parameter $X_{RV}$ in a base station of a mobile communications network.

The invention relates to any type of mobile communications network in which HS-DSCH downlinks associated with one or more HS-PDSCH physical channels and as defined in version 5 of the 3GPP specifications (available on the 3GPP site) can be set up between a base station and one or more user equipments. It therefore applies to 3GPP radio (or mobile) communications, in particular to W-CDMA, CDMA 2000, IS95, UMTS, GSM/GPRS and EDGE networks. A UMTS network is considered hereinafter by way of example.

The expression "user equipment" means any communications terminal capable of exchanging data by radio, in the form of signals, with either another user equipment or an equipment of its parent network, such as a base station, for example. It could be a mobile telephone, a personal digital assistant (PDA) or a portable computer equipped with a radio communications system, for example.

Figure 1:
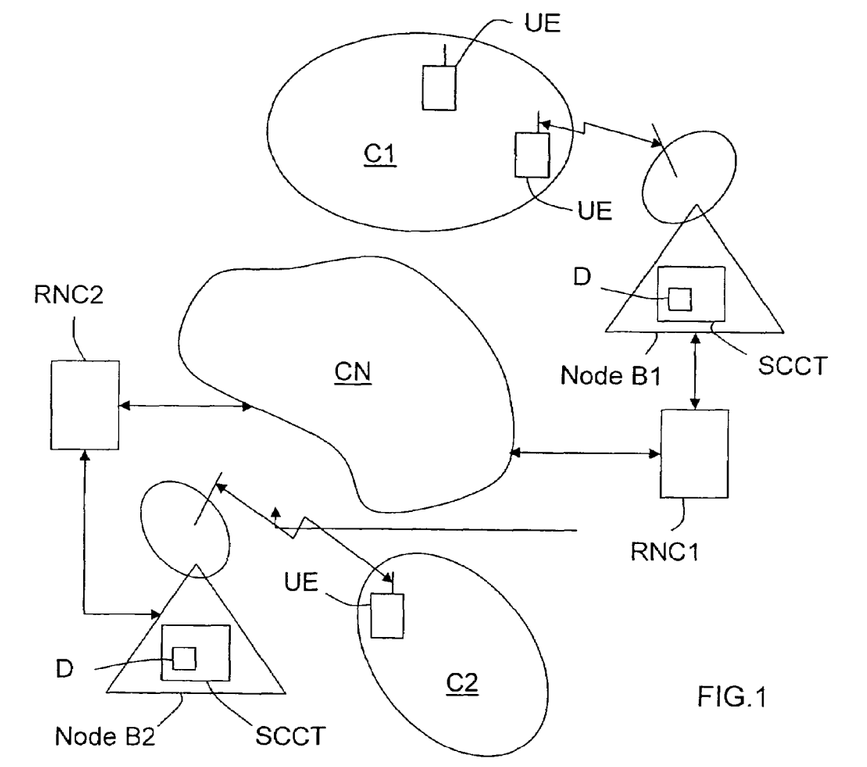
FIG. 1 is a diagram of one embodiment of a portion of a UMTS communications network comprising base stations (Node Bs) equipped with a processing device of the invention.

A mobile communications network in which the invention can be implemented (in this instance a UMTS network) is described first with reference to FIG. 1.

Broadly speaking, but in sufficient detail to enable the invention to be understood, a UMTS network can be regarded as a core network (CN) coupled to a radio access network including one or more base stations known as Node Bs and connected to the core network CN by one or more radio network controllers (RNC). In the example shown, the UMTS network comprises two base stations, Node B1 and Node B2, connected to the core network CN by respective nodes RNC1 and RNC2. In this example, each base station Node B1, Node B2 is associated with a single cell C1, C2 covering a radio area in which there may be one or more user equipments UE.

Each node Bi (here i=1, 2) is responsible for signal processing and in particular for managing requests for access to the UMTS network submitted by user equipments UE in the cell Ci that it controls and for managing HS-DSCH transport channels that it has set up with user equipments UE situated in its cell Ci.

Figure 2:
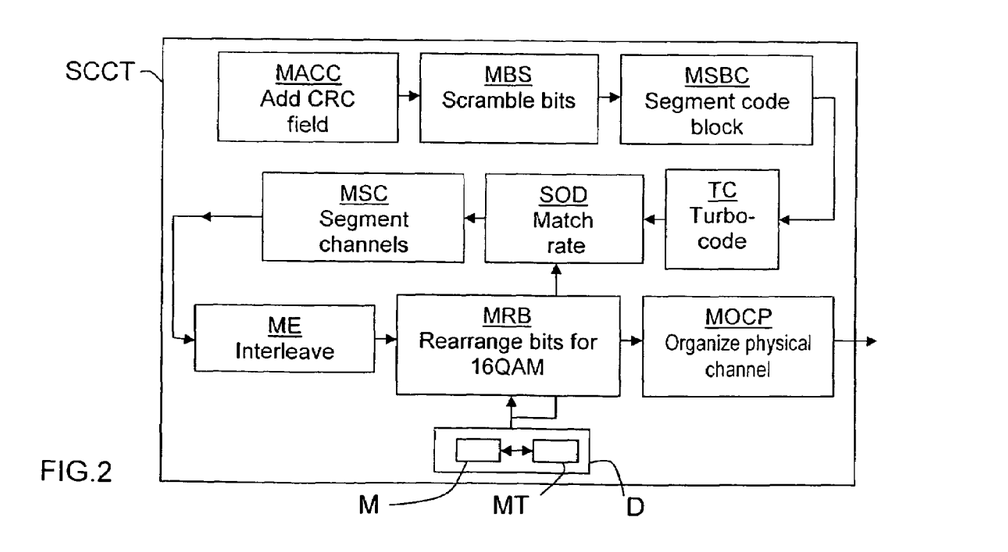
FIG. 2 is a functional diagram of one embodiment of a transport channel coding system equipped with a processing device of the invention.
Figure 3:
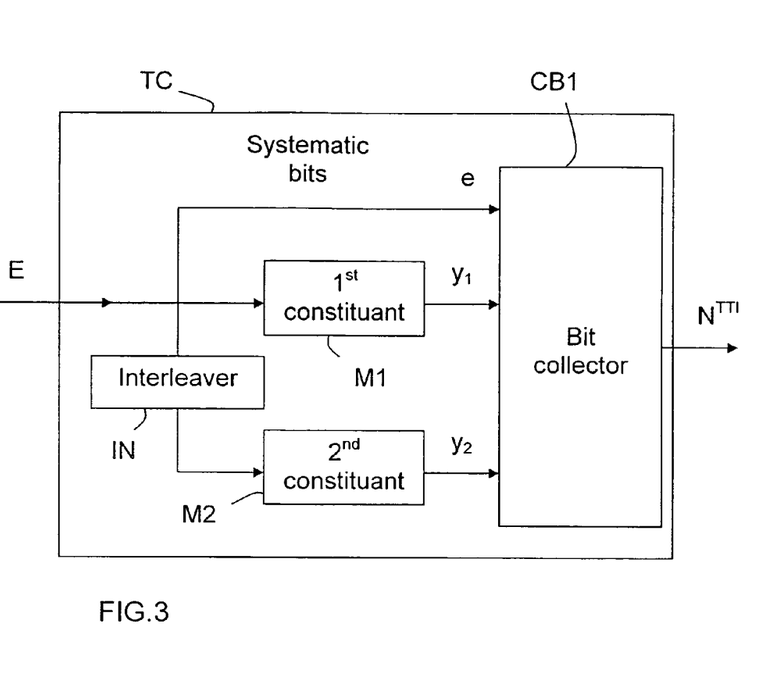
FIG. 3 is a functional block diagram of one embodiment of a turbocoder for the FIG. 2 transport channel coding system.
Figure 4:
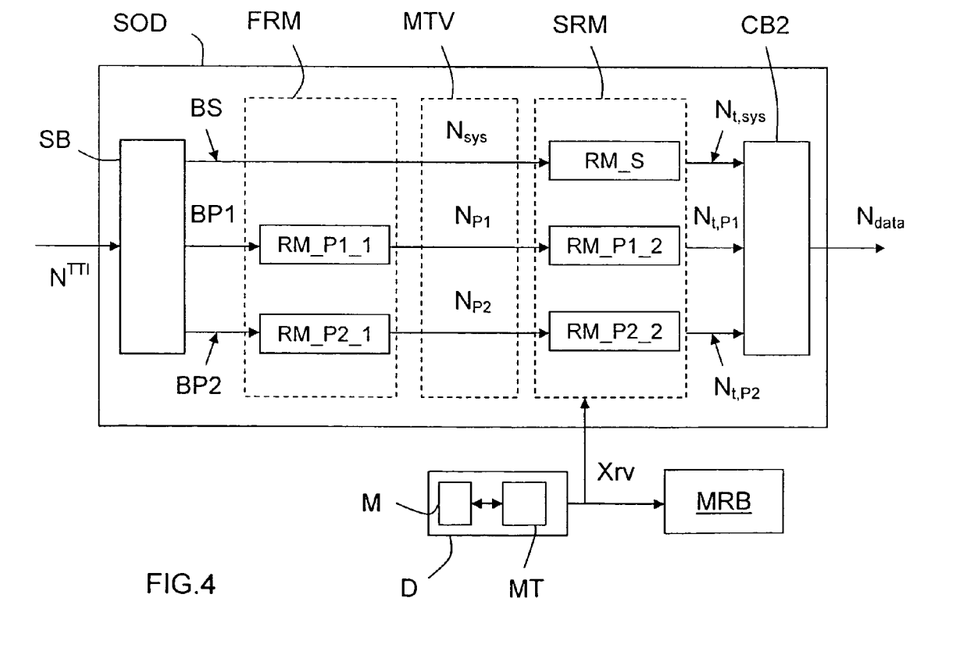
FIG. 4 is a functional block diagram of one embodiment of a rate matching system for the FIG. 2 transport channel coding system.

For the purposes of managing the HS-DSCH transport channels, each Node Bi comprises a transport channel coding system SCCT of the type shown by way of example in the FIG. 2 diagram. The SCCT system is not described in detail here because it is well known to the person skilled in the art and does not constitute the primary subject matter of the invention. Suffice to say that it generally comprises:

a module MACC for adding a cyclic redundancy check (CRC) field to data delivered by the concatenation module CC (the user equipment UE to which the data is addressed uses the CRC field to detect data transmission errors), a bit scrambling module MBS for placing data bits delivered by the MACC module in a pseudorandom order in order to optimize the performance of the turbocoding (TC) module, whose performance could be degraded by some particular bit sequences, a code block segmentation module MSBC for segmenting data blocks delivered by the module MBS into smaller blocks, in order to deliver blocks smaller than the maximum size supported by the channel coder, which is defined by the Technical Specification 3GPP TS 25.212, a turbocoding (or turbocoder) module TC of the type shown in FIG. 3 for coding data bits delivered by the code block segmentation module MSBC in order to deliver coded bit streams $N^{TTI}$ of the "systematic", "parity 1" and "parity 2" types, referred to hereinafter as input bit streams, and to this end comprising:

an input E fed with uncoded data bits, a first coding module M1 fed with uncoded bits coming directly from the input E and delivering coded bits of parity 1 ($y_1$ bits), a second coding module M2 fed with uncoded bits coming from the input E via an interleaver IN and delivering coded bits of parity 2 ($y_2$ bits), a bit collection module fed with uncoded systematic bits (e) coming directly from the input E, parity 1 coded bits ($y_1$ bits) coming from the first module M1, and parity 2 coded bits ($y_2$ bits) coming from the second module M2 and delivering coded bitstreams $N^{TTI}$, and an output S1 delivering the three different coded bit streams $N^{TTI}$, a rate matching system SOD for matching the respective bit rates of the various types of input bits (systematic, parity 1, parity 2) delivered by the turbocoder TC and for delivering "output" bits, as explained later with reference to FIG. 4, a physical channel segmentation module MSC responsible for segmenting (or separating) output bits delivered by the rate matching system SOD and transported by the HS-DSCH transport channel so that they can be divided between the various HS-PDSCH physical channels, an interleaving module ME for interleaving bits delivered by the physical channel segmentation module MSC to mix them to improve error correcting coding (TC) performance vis-à-vis the radio channel, where applicable, when 16 QAM modulation is used, a bit rearrangement module MRB for rearranging data bits delivered by the interleaving module ME, and a physical channel rate matching module MOCP for supplying the HS-PDSCH physical channel(s) with bits delivered by the interleaving module ME or the bit rearrangement module MRB.

The maximum number of output bits that can be transmitted on the N (N>0) HS-PDSCH physical channels associated with an HS-DSCH transport channel in a given transmission time interval (TTI) varies as a function of the type of modulation. For each time transmission interval TTI, consisting of three slots of 2 ms total duration (which corresponds to one block transmitted every 2 ms), in the case of QPSK modulation, the maximum number of bits is equal to N×960, whereas in the case of 16 QAM modulation this number is equal to N×1920, where N represents the number of HS-PDSCH physical channels used to transport the blocks of data bits of an HS-DSCH transport channel, and therefore the number of codes (there is one code per physical channel). Given the rate matching effected by the rate matching system SOD, the physical channel organization module MOCP constitutes blocks of digital data that fill optimally the N HS-PDSCH physical channels associated with the HS-DSCH transport channel.

The rate matching system SOD selects the data bits that a Node B must retransmit with the highest priority in one or more HS-PDSCH physical channels associated with an HS-DSCH transport channel and in the form of a block to a user equipment UE that has informed it, by means of an NACK message, in accordance with the Hybrid Automatic Repeat reQuest (HARQ) technique, that it has not received a (preceding) first block correctly.

The rate matching system SOD of the invention is described in detail next with reference to FIG. 4.

As indicated in the introduction, the invention concerns the organization of bit rates in the incremental redundancy (IR) mode in which the set of data bits that a block contains that is retransmitted as a consequence of incorrect reception of a first block differs at least in part from the set of data bits of the block that precedes it. The aim is to use for each new retransmission bits other than those previously transmitted. This enables either transmission of the bits eliminated at the time of the first transmission or improved protection of other bits in the event of repetition of bits at the time of the first transmission. A block is decoded in the destination user equipment UE by combining the contents of its various versions transmitted successively by the Node B to which it is momentarily attached and stored temporarily in a buffer.

As mentioned above, the bits to be transmitted, both on a first transmission and on subsequent retransmissions in the context of the HARQ procedure, are selected by the rate matching system SOD as a function of the value of a redundancy parameter $X_{RV}$. The overall performance of rate matching in the incremental redundancy (IR) mode depends primarily on the successive values of $X_{RV}$ used for each (re) transmission.

According to its value, this parameter $X_{RV}$ designates the type of bits (systematic, parity 1 or parity 2) that must be transmitted with the highest priority and therefore the bits with the highest priority for elimination or repeating.

As shown in FIG. 4, the rate matching system SOD includes a bit separation module SB that is supplied with an input bit stream $N^{TTI}$ by the turbocoder TC and separates the various types of input bits (systematic (BS) bits, parity 1 (BP1) bits and parity 2 (BP2) bits) in order for them to be processed separately by a first rate matching stage FRM.

The first rate matching stage FRM is responsible for matches the number $N^{TTI}$ of input bits delivered by the turbocoder TC to the number of "intermediate" bits that an IR virtual buffer (MTV) of the invention is able to contain.

To this end, the first rate matching stage FRM includes two rate matching modules RM_P1_1 and RM_P2_1 for processing the parity 1 bits BP1 and the parity 2 bits BP2, respectively, in order to deliver to their outputs a parity 1 bit stream $N_{P1}$ and a parity 2 bit stream $N_{P2}$.

The number $N^{TTI}$ of input bits generally being greater than the number of intermediate bits that the virtual buffer MTV is able to contain, the rate matching modules RM_P1_1 and RM_P2_1 eliminate some of them; this is known as "puncturing". This bit elimination or "puncturing" technique is defined by the Technical Specification 3GPP TS 25.212, version 5.3.0.

The systematic bits are not subjected to any elimination processing in the first rate matching stage FRM and are delivered directly to a third output in the form of a systematic bitstream $N_{sys}$.

The three bitstreams $N_{sys}$, $N_{P1}$ and $N_{P2}$ feed the virtual buffer MTV. The size of the buffer MTV depends on the number of (intermediate) bits that must be stored in the Node B until the destination user equipment UE has received a first block correctly and has sent said Node B an acknowledgement message ACK in accordance with the HARQ technique.

The rate matching system SOD also includes a second rate matching stage SRM for defining the priority bit rate of each type of bitstream for each retransmission as a function of the value of a redundancy parameter $X_{RV}$ and for matching the number of intermediate bits stored in the virtual buffer MTV to the maximum number of "output" bits that can be transmitted by the N HS-PDSCH physical channels associated with an HS-DSCH transport channel, during a given time interval (TTI).

To this end it comprises three rate matching modules RM_S, RM_P1_2 and RM_P2_2 for processing the systematic bitstream $N_{sys}$, the parity 1 bitstream $N_{P1}$ and the parity 2 bitstream $N_{P2}$, respectively, in order to deliver at their outputs systematic bitstreams $N_{t,sys}$, parity 1 bitstreams $N_{t,p1}$ and parity 2 bitstreams $N_{t,p2}$ that feed a bit collector CB2 delivering at an output an output bitstream $N_{data}$ grouping together the various bits streams selected and feeding the physical channel segmentation module MSC.

According to the maximum number of output bits that can be transmitted by the set of N HS-PDSCH physical channels associated with an HS-DSCH transport channel, during a given time interval (TTI), the rate matching modules RM_S, RM_P1_2 and RM_P2_2 either eliminate (or puncture) intermediate bits or add bits, by a process of repetition.

Each time that the Node B receives a NACK message from a user equipment UE, the second rate matching stage SRM of its rate matching system SOD determines a set of output bits for the block to be retransmitted from the intermediate bits stored in the buffer MTV. That set is identical to the set previously (re)transmitted in the case of CC transmission or different from the set previously (re)transmitted in the case of IR transmission.

The management device D of the invention selects each parameter value $X_{RV}$ used by the second rate matching stage SRM of the rate matching system SOD, and where applicable, when the modulation is 16 QAM modulation, by the module MRB of the transport channel coding system SCCT.

It can form an integral part of the transport channel coding system SCCT and be coupled to its rate matching system SOD and to its bit rearrangement module MRB, or be external to the transport channel coding system SCCT (for example installed in a base station) and coupled to the rate matching system SOD and to the bit rearrangement module MRB. When the modulation is QPSK modulation, the management device D can also be an integral part of the rate matching system SOD, since only said system uses said device. It can also form part of a radio network controller (RNC) coupled to one or more base stations.

To be more precise, the management device D includes a processing module MT for selecting each value of the redundancy parameter $X_{RV}$ to be used by the rate matching system SOD and where applicable by the bit rearrangement module MRB.

In the current version of the UMTS standard, the redundancy parameter $X_{RV}$ is defined by at least a first variable s and a second variable r.

To be more precise, in the current version of the UMTS standard, when transmission is effected on the HS-DSCH channel using QPSK modulation, $X_{RV}$ is defined by the first variable s and the second variable r. In this case, the variable s generally takes the values 0 and 1 whereas the variable r takes the value 0 and 1, or the values 0, 1 and 2, or the values 0, 1, 2 and 3.

Moreover, in the current version of the UMTS standard, when transmission is effected on the HS-DSCH channel by means of 16 QAM modulation, $X_{RV}$ is defined by the first variable s, the second variable r and a third "constellation version" variable b. In this case, the variable s generally takes the values 0 and 1, the variable r generally takes the values 0 and 1, and the variable b takes the values 0 and 1 or the values 0, 1 and 2 or, and more generally, the values 0, 1, 2 and 3. The three variables r, s and b define the parameter $X_{RV}$. The variable b more particularly tells the bit rearrangement module MRB of the transport channel coding system SCCT how to match bits and symbols.

According to the invention, each time that a given block must be transmitted on the HS-DSCH channel, the processing module MT selects successive values of the redundancy parameter $X_{RV}$ conforming to a given sequence.

Within each sequence, the value of $X_{RV}$ that is used for the first transmission of a block is selected so that it gives the highest priority to transmitting systematic bits.

The value of $X_{RV}$ used for each block (re)transmission subsequent to the first transmission is preferably selected so that it gives the highest priority to the alternate transmission of parity 1 or 2 bits and systematic bits. In other words, it is preferable to alternate, from one transmission to another, the priorities of the systematic bits and the parity 1 or 2 bits, given that the systematic bits have the highest priority on the first transmission.

It is the variable s that conditions priority. To be more precise, when s is equal to 1, the highest priority is given to transmitting systematic bits, whereas the highest priority is given to transmitting parity 1 or 2 bits when s is equal to 0.

The variable r varies the repetition or elimination diagrams used by the three organization modules RM_S, RM_P1_2 and RM_P2_2 of the second rate matching stage SRM to determine the bit rates of the streams of bits of the three types.

Moreover, the processing module MT can be adapted to select the successive values of the redundancy parameter $X_{RV}$ conforming to a chosen sequence in which each value of the redundancy parameter $X_{RB}$ is selected to allow alternating bit/symbol matching during each transmission.

Larger or smaller sequences can be defined. For example, a sequence can comprise a series of two, three, four, five, six, seven or even more values of $X_{RV}$.

For example, a sequence may consist of the series of values {0,1,2,3,4,5,6,7} or the series of values {0,1,2,3,4}.

Figure 5:
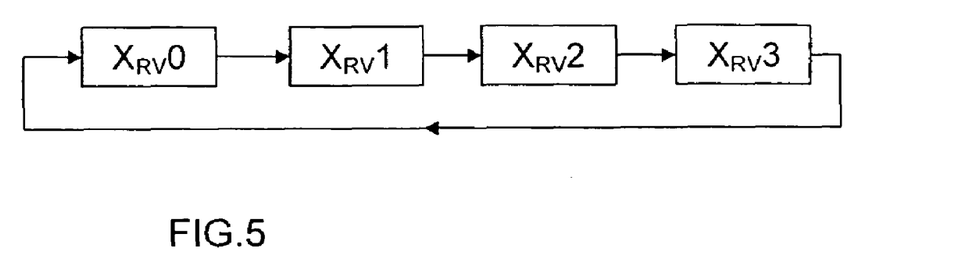
FIG. 5 is a diagram of one example of a cyclic management procedure using four different values of the redundancy parameter $X_{RV}$ constituting a sequence.

However, it is equally possible to configure the processing module MT so that it cyclically repeats a sequence initially provided for a plurality of transmissions, for example four transmissions (a first transmission with the highest priority going to the systematic bits and three retransmissions with the highest priority alternating between the parity 1 or 2 bits and the systematic bits), when more than four transmissions are necessary. Five 5 shows a situation of this kind. To be more precise, in this example, the processing module MT uses a looped sequence consisting of the series of values $\{X_{RV}0, X_{RV}1, X_{RV}2, X_{RV}3\}$. When the last value ($X_{RV}3$) of the sequence has been used for the fourth transmission, the first value ($X_{RV}0$) of the sequence is used again for the fifth transmission, then the second value ($X_{RV}1$), then the third value ($X_{RV}2$), then the fourth value ($X_{RV}3$), then the first value ($X_{RV}0$) again, and so on, should this prove necessary.

In other words, if a block must be transmitted an $n^{th}$ time, the value of $X_{RV}$ used is defined by the equation: $X_{RV}=T[(n-1) \text{ modulo } L]$, in which T designates the value $X_{RV}(n)$ of the chosen sequence and L is the length of the sequence (i.e. the number of values that it contains, which is greater than or equal to 2 in the IR mode or equal to 1 in the CC mode, in which it is always the same sequence of bits that is retransmitted with the same value of $X_{RV}$).

In practice, it is preferable to use a maximum of different values of $X_{RV}$.

In the case of QPSK modulation, the processing module MT can select each sequence so that it constitutes an alternating series of even and odd values of $X_{RV}$, the first value, corresponding to the first transmission, being even. Under the current version of the UMTS standard, it is possible to define the parameter $X_{RV}$ by means of an equation such as: $X_{RV}=2r+1-s$.

With this kind of equation, each time that the variable s is equal to 1, $X_{RV}$ is even, whereas each time that the variable s is equal to 0, $X_{RV}$ is odd. Consequently, each time that $X_{RV}$ is even the highest priority is assigned to the systematic bits, whereas each time that $X_{RV}$ is odd the highest priority is assigned to the parity 1 or 2 bits.

The processing module MT can also choose each sequence so that it constitutes an alternating series of values of $X_{RV}$ in which the value of the variable r varies with each alternation or every two values of $X_{RV}$.

For example, within a sequence, r can vary as follows 0,1,2,3,0,1,2,3,0, ..., or as follows 0,0,1,1,2,2,3,3,0,0,1, 1, ..., or as follows 2,2,1,1,2,2,1,1,2,2, ....

The table below gives one example of combinations of values of the variables s and r, yielding different values of $X_{RV}$.

| $X_{RV}$ | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

It is important to note that using alternating even and odd values of $X_{RV}$ is equivalent to alternating the priority between the systematic bits and the parity 1 or 2 bits. This is also equivalent to stating that s must be equal to 1 during the first transmission and then alternate between 0 and 1 for subsequent retransmissions, and that at the same time r must vary during each (re)transmission or every two (re)transmissions.

It is also important to note that the values of $X_{RV}$ do not necessarily increase with their position within their sequence. What is important is that the order of the values of $X_{RV}$ corresponds to an alternation of 1 and 0 values of s. For example, a sequence can be defined by the series of increasing values {0,1,2,3,4,5,6,7}, but can equally be defined by the series of values in no particular order {2,5,6,1,0,3,4,7}. In these various, purely illustrative examples, the values of $X_{RV}$ of the sequences corresponds to the pairs of values (s,r) defined in the above table.

In the case of 16 QAM modulation, the processing module MT can, for example, select each sequence so that it constitutes a series of values of $X_{RV}$ in which the value of the variable r varies with each value of $X_{RV}$ or every two values of $X_{RV}$, for example during at least the first four transmissions (although this is not obligatory).

For example, in addition to or instead of this, the processing module MT can select each output sequence so that it constitutes a series of values of $X_{RV}$ in which the value of the variable b varies with each value of $X_{RV}$ or every two values of $X_{RV}$, for example during at least the first four transmissions (although this is not obligatory).

It is preferable to vary r, if possible, during each transmission and, should it also be possible, to vary b, preferably during each transmission. In other words, it is possible to vary r and b either simultaneously, for example during each transmission, or alternately, for example every two transmissions.

Moreover, as in the case of QPSK modulation, the processing module MT is preferably adapted to select each sequence so that it constitutes an alternating series of values of the redundancy parameter $X_{RV}$ in which the variable s is either equal to 1 or equal to 0.

The table below gives one example of combinations of values of the variables s, r and b, yielding different values of $X_{RV}$, in the context of the current version of the UMTS standard.

| $X_{RV}$ | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

It is important to note that the values of $X_{RV}$ do not necessarily increase with their position within their sequence. What is important is that the order of the values of $X_{RV}$ corresponds to an alternation of 1 and 0 values of s.

It is also important to note that in the case of 16 QAM modulation the values of $X_{RV}$ corresponding to a value of s equal to 1 are not only even values (see the above table). As a result of this, the sequences of alternating values 0 and 1 for the variable s are no longer sequences alternating the parity of $X_{RV}$.

For example, a sequence can be defined by the series of increasing values {0,1,2,3,4,1,6,3}, which is an alternating series of even and odd values, but can equally be defined by the following series of values in no particular order {0,1,2,3, 4,1,5,3}, the following series of values in no particular order {0,3,5,1}, the following series of values in no particular order {0,3,6,1}, the following series of values in no particular order {5,3,7,1}, or the following series of values in no particular order {6,3,7,1}. In these various and purely illustrative examples, the values of $X_{RV}$ of the sequences correspond to the triplets of values (s,r,b) defined in the above table.

It is important to note that the management device D preferably has a memory M in which the various values of $X_{RV}$ for constituting the sequences are stored. This memory M can also store the definitions of the sequences. Thus, when the device D must intervene, its processing module MT has only to extract the values of $X_{RV}$ from the memory M in order to forward them to the second rate matching stage SRM, and where applicable to the bit rearrangement module MRB. The values and/or the definitions of the sequences can be stored in the memory M either permanently or temporarily. In other words, it is an option to envisage changing dynamically the content of the memory M, for example by means of a local terminal, the radio network controller RNC to which is connected the base station (Node B) in which the transport channel coding system (SCCT) is installed, or the OMC. Another option is to install the management device D of the invention in a radio network controller RNC in order to supply at least one base station of the network with sequences of values of the redundancy parameter $X_{RV}$.

The processing device D of the invention, and in particular its processing module PM, may be implemented in the form of electronic circuits, software (or data processing) modules, or a combination of circuits and software, for example. The same goes for the rate matching system SOD and the transport channel coding system SCCT.

The invention can equally be seen as a method of managing the transmission of digital data blocks in an HS-DSCH downlink transport channel set up between a communications network and a user equipment UE, wherein, in the event of incorrect reception by the user equipment UE of a block including a first set of digital data selected as a function of a value of a redundancy parameter $X_{RV}$, for example defined by at least the first variable s and the second variable r, there is transmitted to that user equipment UE at least one other block including another set of digital data selected as a function of another value of the redundancy parameter.

The above method can in particular be implemented by means of the management device D of the rate matching system SOD and the transport channel coding system SCCT described hereinabove. The main optional functions and sub-functions of that method being substantially identical to those of the various means constituting the management device D and/or the rate matching system SOD and/or the transport channel coding system SCCT, there are summarized hereinafter only the steps that implement the main functions of the method of the invention.

That method is characterized in that each time a given block must be transmitted, successive values of the redundancy parameter $X_{RV}$ are used in a selected sequence in which the value of the redundancy parameter $X_{RV}$ used for each first block transmission corresponds to priority transmission of systematic bits.

Moreover, it is preferable to choose the successive values of the redundancy parameter $X_{RV}$ in accordance with a selected sequence in which the value of the redundancy parameter $X_{RV}$ that is used for each block transmission after the first transmission corresponds to alternating priority transmission of parity 1 or 2 bits and transmission of systematic bits.

Thanks to the invention, it is possible to reduce significantly the power needed to obtain a given bit rate. For example, the power can be reduced by a factor substantially equal to 3.5 after three block transmissions.

The invention is not limited to the embodiments of a management device, a rate matching system, a transport channel coding system and a management method described hereinabove by way of example only, but encompasses all variants that the person skilled in the art might envisage that fall within the scope of the following claims.

In the foregoing description there has been described, with reference to FIGS. 2 and 4, an embodiment in which the management device of the invention is installed in the transport channel coding system in order to supply values of $X_{RV}$ to its rate matching system and its bit rearrangement module (MRB), for example in the case of 16 QAM modulation. However, the management device of the invention can equally be installed in the rate matching system in the case of 16 QAM modulation. It can equally be installed in the base station in which the transport channel coding system is installed or in a radio network controller coupled to that base station.

The invention claimed is:

1. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:
   processing means for selecting a first value of a redundancy parameter in view of a first transmission of a first digital data block to said user equipment including a first set of digital data selected as a function of said first value,
   wherein, in the event of incorrect reception of the first digital data block by said user equipment, the processing means select at least a second value of said redundancy parameter in view of a second transmission to said user equipment of at least a second digital data block including a second set of digital data selected as a function of said second value, and
   wherein, each time that a given digital data block must be transmitted in said channel, the processing means select successive values of the redundancy parameter in accordance with a selected sequence in which the value of the redundancy parameter used for the first transmission is selected to give priority to transmitting systematic bits and values of the redundancy parameter in the selected sequence used for digital data block transmissions after the first transmission are selected to give priority alternately to transmitting parity 1 or parity 2 bits and to transmitting bits.

2. A device according to claim 1, wherein, in the selected sequence, the successive values of the redundancy parameter are selected by the processing means to alternate bit/symbol matching on each transmission.

3. A device according to claim 1, wherein said processing means are adapted to use said selected sequence cyclically.

4. A base station for a mobile communications network, said base station comprising at least one management device according to claim 1.

5. A radio network controller for a mobile communications network, said radio network controller comprising at least one management device according to claim 1, and supplying a base station of said mobile communications network with sequences of values of the redundancy parameter.

6. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:
   processing means for selecting a first value of a redundancy parameter in view of a first transmission of a first digital data block to said user equipment including a first set of digital data selected as a function of said first value,
   wherein, in the event of incorrect reception of the first digital data block by said user equipment, the processing means select at least a second value of said redundancy parameter in view of a second transmission to said user equipment of at least a second digital data block including a second set of digital data selected as a function of said second value, and
   wherein, each time that a given digital data block must be transmitted in said channel, the processing means select successive values of the redundancy parameter in accordance with a selected sequence in which the value of the redundancy parameter used for the first transmission is selected to give priority to transmitting systematic bits,
   wherein said redundancy parameter is defined by at least a first variable and a second variable, and wherein, in the case of transmission using Quadrature Phase-Shift Keying (QPSK) modulation, in which the first variable can take two values selected from 0 and 1 and the second variable can take at least two values selected from 0, 1, 2 and 3, each sequence comprises a series of values of the redundancy parameter in which said first value, corresponding to said first transmission, is even.

7. A device according to claim 6, wherein said redundancy parameter is defined by the equation XRV=2r+1−s, wherein r represents the first variable, s represents the second variable, and XRV represents the redundancy parameter.

8. A device according to claim 6, wherein each sequence comprises an alternating series of even values of the redundancy parameter, corresponding the first variable being equal to 1, and odd values of the redundancy parameter, corresponding to the first variable being equal to 0.

9. A device according to claim 6, wherein each sequence comprises a series of values of the redundancy parameter in which the value of the second variable varies with each value of the redundancy parameter.

10. A device according to claim 6, wherein each sequence comprises a series of values of the redundancy parameter in which the value of the second variable varies with every two values of the redundancy parameter.

11. A device according to claim 4, wherein each sequence comprises a series of values of the redundancy parameter selected from at least a portion of the series {0, 1, 2, 3, 4, 5, 6, 7}, {0, 1, 2, 3} and {2, 1, 0, 3, 4}, said values 0, 1, 2, 3, 4, 5, 6 and 7 respectively corresponding to pairs of values of the first and second variables as follows: (1, 0), (0, 0), (1, 1), (0, 1), (1, 2), (0, 2), (1, 3) and (0, 3).

12. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, wherein, in the selected sequence, the successive values of the redundancy parameter are selected by the processing means to alternate bit/symbol matching on each transmission, wherein said redundancy parameter is defined by at least a first variable and a second variable, wherein, in the case of transmission using Quadrature Phase-Shift Keying (QPSK) modulation, in which the first variable can two values selected from 0 and 1 and the second variable can take at least two values selected from 0, 1, 2 and 3, the processing means select each sequence to comprise a series of values of the redundancy parameter in which said first value, corresponding to said first transmission, is even, and wherein each sequence comprises an alternating series of even and odd values of the redundancy parameter, said first value, being even.

13. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take at least two values selected from 0 and 1, and the third variable defining bit/symbol matching, the processing means select each sequence to comprise a series of values of the redundancy parameter in which the value of the second variable varies with each value of the redundancy parameter, at least during the first and second transmissions.

14. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprises a series of values of the redundancy parameter, at least during the first and second transmission and subsequent third and fourth transmissions.

15. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise a series of values of the redundancy parameter in which the value of the third variable varies with each value of the redundancy parameter, at least during the first and second transmissions.

16. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise a series of values of the redundancy parameter in which the value of the third variable varies with every two values of the redundancy parameter.

17. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise an alternating series of values of the redundancy parameter in which said first variable is either equal to 1 or equal to 0.

18. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise a series of values of the redundancy parameter in which the values of the second variable and the third variable vary simultaneously for each value of the redundancy parameter.

19. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise a series of values of the redundancy parameter in which the values of the second variable and the third variable vary alternately from one value of the redundancy parameter to another.

20. A device for managing transmission of digital data blocks of digital data in a High Speed Downlink Shared Channel (HS-DSCH) downlink transport channel set up between a base station of a communications network and a user equipment, said digital data being of a systematic type and parity 1 or parity 2 type, said device comprising:

processing means for selecting a first value of a redundancy parameter in view of a first transmission of a first digital data block to said user equipment including a first set of digital data selected as a function of said first value, wherein, in the event of incorrect reception of the first digital data block by said user equipment, the processing means select at least a second value of said redundancy parameter in view of a second transmission to said user equipment of at least a second digital data block including a second set of digital data selected as a function of said second value, and wherein, each time that a given digital data block must be transmitted in said channel, the processing means select successive values of the redundancy parameter in accordance with a selected sequence in which the value of the redundancy parameter used for the first transmission is selected to give priority to transmitting systematic bits, and wherein, in the case of transmission using 16-Quadrature Amplitude Modulation (16QAM) modulation, for which said redundancy parameter is defined by a first variable, a second variable and a third variable, the first variable being able to take two values selected from 0 and 1, the second variable being able to take two values from 0 and 1, and the third variable defining bit/symbol matching, the processing means select each sequence to comprise a series of values of the redundancy parameter chosen from at least a portion of the series {0,3,5,1,2}, {0,3,5,1,4}, {0,3,5,1,6}, {0,3,5,1,7}, {0,3,6,1,2}, {0,3,6,1,4}, {0,3,6,1,5}, {0,3,6,1,7}, {6,3,7,1,0}, {6,3,7,1,2}, {6,3,7,1,4} and {6,3,7,1,5}, said values 0, 1, 2, 3, 4, 5, 6 and 7 respectively corresponding to triplets of values of the first, second and third variables as follows:(1,0,0), (0,0,0), (1,1,1), (0,1,1), (1, 0, 1), (1,0,2), (1,0,3) and (1,1,0).

21. A method of managing transmission of digital data blocks of digital data on a High Speed Downlink Shared Channel (HS-DSCH) downlink transport channel set up between a communications network and a user equipment, said digital data being of a systematic type and a parity 1 or parity 2 type, said method comprising:

in the event of incorrect reception by said user equipment of a first digital data block including a first set of digital data selected as a function of a value of a redundancy parameter, transmitting, by a processor, to the user equipment at least a second digital data block including a second set of digital data selected as a function of a second value of said redundancy parameter, wherein, for a given digital data block to be transmitted, successive values of the redundancy parameter are used in accordance with a selected sequence in which the value of the redundancy parameter used for the first block transmission corresponds to priority transmission of systematic bits and the value of the redundancy parameter used for each block transmission after the first transmission corresponds to alternating priority transmission of parity 1 or parity 2 bits and priority transmission of systematic bits.

* * * * *